United States Patent [19]
Svetlinchny

[11] 3,741,653
[45] June 26, 1973

[54] COMPUTER-AIDED LASER-BASED AIRBORNE MEASUREMENT SYSTEM

[75] Inventor: Oleg Svetlinchny, Chelmsford, Mass.
[73] Assignee: Geosystems, Inc., Waltham, Mass.
[22] Filed: July 6, 1970
[21] Appl. No.: 52,524

[52] U.S. Cl.................... 356/141, 356/5, 356/141, 340/16 R, 324/4, 343/112 C, 343/5 CM
[51] Int. Cl............................................. G01c 3/00
[58] Field of Search.................. 856/1, 2, 4, 5, 141; 340/16 R; 235/151, 32; 343/5 CM, 112 C; 324/4

[56] References Cited
UNITED STATES PATENTS

| | | | |
|---|---|---|---|
| 3,653,769 | 4/1972 | Albright | 356/141 |
| 2,681,764 | 6/1954 | Gale | 343/112 C |
| 3,352,223 | 11/1967 | Garra | 356/1 |
| 3,504,182 | 3/1970 | Pizzurro et al. | 356/141 |
| 3,202,040 | 8/1965 | Burkhart | 356/1 |

*Primary Examiner*—Benjamin A. Borchelt
*Assistant Examiner*—S. C. Buczinski
*Attorney*—Morse, Altman & Oates

[57] ABSTRACT

In an airborne vehicle, a system having laser sources and optical tracking assemblies electrically communicating with a computer is provided for determining the absolute (inertial) path, position, velocity and acceleration of the vehicle and for surveying the ground contour. A laser beam is directed toward a ground retroreflector and the reflected beam is tracked by an optical tracker. Another laser beam scans, in a preprogrammed pattern, the ground contour and another optical tracker follows the scanning beam. Modulation and phase comparison techniques are utilized to measure the range between the vehicle and the ground retroreflector and between the vehicle and the scanned ground. Data generated by the laser source and optical tracking assemblies are applied to the computer for determination of desired position data by triangulation. The inertial velocity and acceleration of the vehicle and the ground profile above sea level or some other specified reference surface are then determined using either airborne or ground based computer.

14 Claims, 7 Drawing Figures

INVENTOR
OLEG SVETLICHNY
BY Morse, Altman & Oates
ATTORNEYS

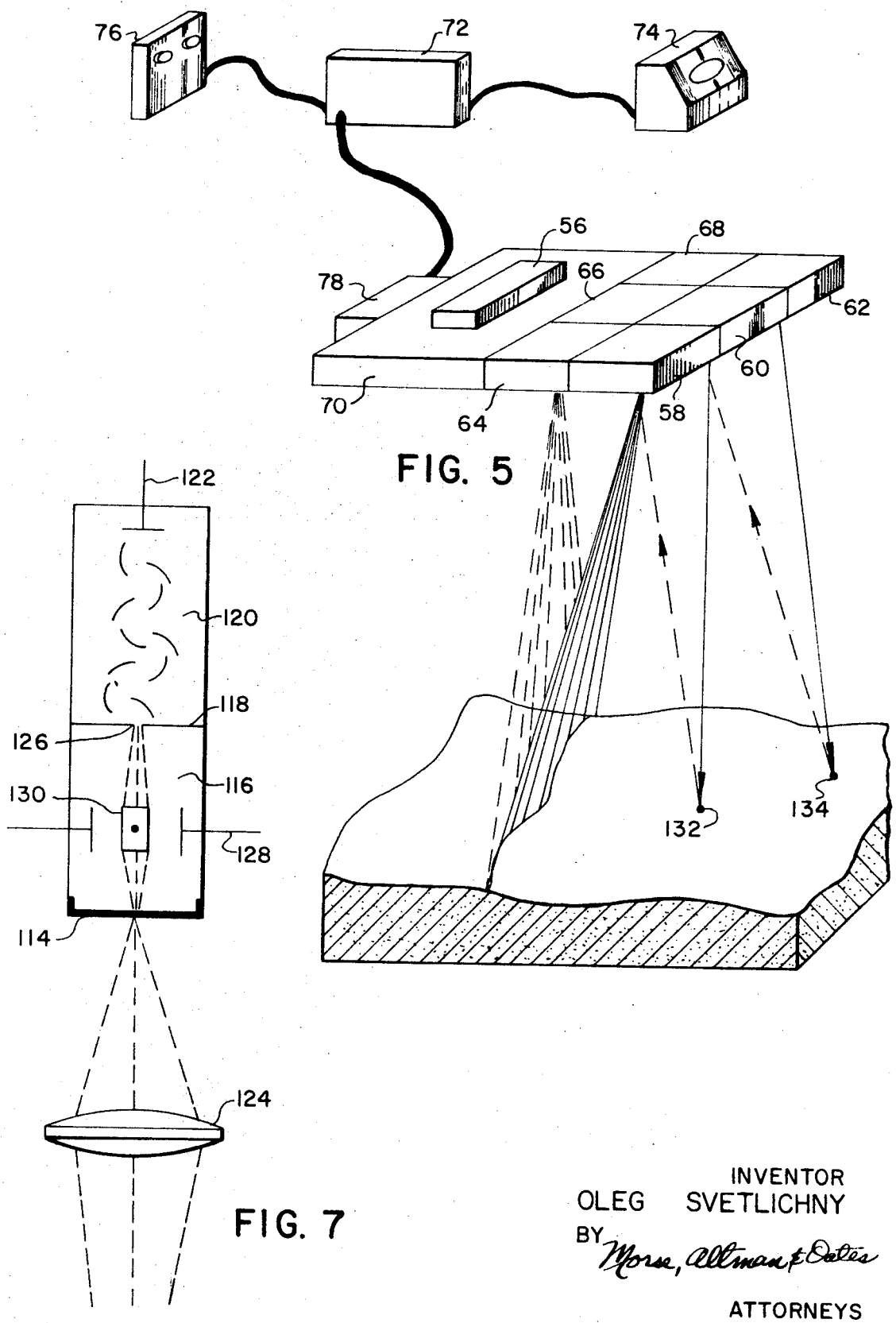

COMPUTER-AIDED LASER-BASED AIRBORNE MEASUREMENT SYSTEM

BACKGROUND OF THE INVENTION

1. Field of Invention

The present invention relates to measurement systems and more particularly to an airborne computer-aided laser-based measurement system.

2. Description of the Prior Art

Measurement systems of various types have been proposed for topographical surveying using aerial photography techniques. Aerial photography allows the modern map maker to gather needed information many times faster than he could obtain through ground surveying techniques. However, aerial photographic systems require extensive and costly ground presurveying of check points along the airplane ground track. In addition, plotting of maps from aerial photographs depends on human eyes for interpretation of the photographs, whereby both the data extraction process time and the cost of maps are increased.

SUMMARY OF THE INVENTION

An object of the present invention is to provide an airborne measurement system for topographical mapping which is characterized by laser and optical tracking assemblies mounted to a stabilized platform and connected to a computer. A frequency modulated laser beam is directed toward a ground retroreflector and the reflected beam is tracked by an optical tracker. Another frequency modulated beam incrementally scans, in a preprogrammed pattern, the ground contour and another optical tracker follows the scanning beam. Output signals from the laser and optical tracking assemblies, representing the angular position of the assemblies with respect to each other and the range of each laser beam from the airborne vehicle to the ground, are applied to the computer for determination of ground contour by triangulation. The combination of laser and optical tracking assemblies and computer is such as to provide an expedicious airborne measurement system for topographical mapping.

Another object of the invention is to provide, in an airborne vehicle, a measurement system for determining the absolute path, position, velocity and acceleration of the vehicle utilizing randomly dropped and three presurveyed ground retroreflectors. The system is characterized by laser and optical tracking assemblies, a device for measuring the angle between each of the laser and optical tracking assemblies, a device for measuring the range between any retroreflector and the vehicle, and a computer for processing the data from the laser and optical tracking assemblies, and the angle and ranging devices. The three presurveyed retroreflectors provide the necessary relationship of the vehicle to any geodetic coordinate system of interest. The data from the angle and ranging devices are entered into the computer for determination of the desired position information by triangulation. The combination of laser and optical tracking assemblies, angle and ranging devices, and computer is such as to provide a versatile and precise system for determining the position and the time derivatives of the position of an airborne vehicle.

The invention accordingly is comprised of the system possessing the construction, combination of elements, and arrangement of parts that are exemplified in the following detailed description, the scope of which will be indicated in the appended claims.

BRIEF DESCRIPTION OF THE DRAWINGS

For a fuller understanding of the nature and objects of the present invention, reference should be had to the following detailed description taken in connection with the accompanying drawings wherein:

FIG. 5 is a block diagram, somewhat perspective, of an alternate measurement system embodying the invention;

FIG. 7 is a schematic diagram of an image dissector tube of FIG. 6.

DETAILED DESCRIPTION OF THE PREFERRED EMBODIMENT

The measurement system operates on a triangulation principle which is based upon the fact that light travels in a straight line. By measuring continuously or quasi-continuously the angle between three line-of-sights from an airborne vehicle to three ground devices and the range between the vehicle and the devices, it is possible to compute the absolute path and position of the vehicle by triangulation.

Figure 1:
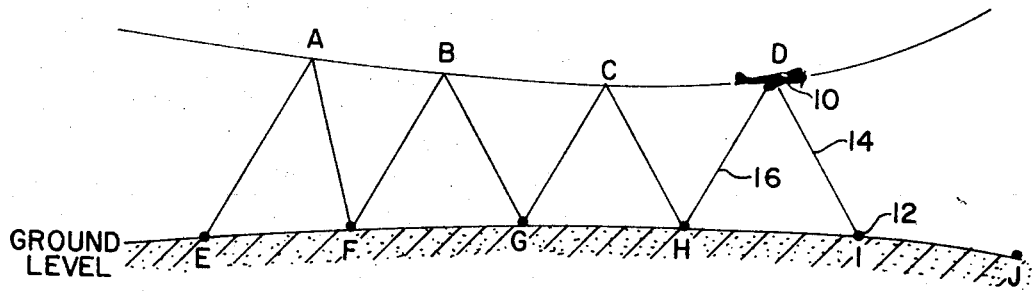
FIG. 1 is a side elevation of a trigonometric diagram illustrating certain principles of the invention.
Figures 2, 4:
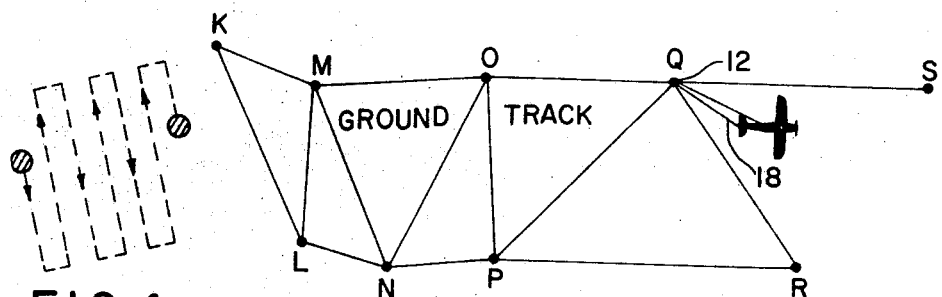
FIG. 2 is a top elevation of a trigonometric diagram illustrating certain principles of the invention.
FIG. 4 is a diagram of a search pattern of the measurement system of FIG. 3.

By way of example, as shown in FIGS. 1 and 2, ground devices 12, for example a retroreflector, a transponder, a beacon or the like, are positioned at the locations designated by the letters E through S. The letters A through D represent specific locations of a vehicle 10, for example an aircraft. It is to be understood that, three of the retroreflectors are placed in accurately presurveyed positions, but not lying on a straight line and the remaining retroreflectors are placed in random locations. These randomly placed retroreflectors could be dropped from the aircraft. The three accurately positioned retroreflectors provide the initial relationship to any geodetic coordinate system of interest. It will be appreciated that these three retroreflectors may be at the beginning, the end, or somewhere in the middle of the flight path of aircraft 10.

The general method of system operation is to continuously compute the aircraft position by triangulation methods where the aircraft and any two retroreflectors form the three vertices of the triangles. In this way, a rigid framework of triangles is constructed containing at some location along the path the three known surveyed retroreflectors and thus providing absolute knowledge of position anywhere in the network.

During flight, the optical range to all visible retroreflectors and the angular subtense between them is regularly measured and stored. Since two legs of a triangle and the angle subtended by them is sufficient to compute the entire triangle, a quasi-continuous knowledge of precise aircraft position is obtained relative to the previously presurveyed three points. Velocity and acceleration are obtained by calculation. An additional computation of the aircraft-to-retroreflector velocity components can be obtained by measurement of the doppler frequency of the reflected signals.

As shown in FIG. 1, aircraft 10 is moving along the path ABCD and the retroreflectors are located at EFGH and I. At the instant illustrated, the system is measuring the triangle HDI using a forward looking optical beam 14 and a backward looking optical beam 16. When the retroreflector at H is too far behind, the beams will change to the retroreflectors at I and J.

In FIG. 2, a beam 18 is directed toward retroreflector 12 at Q and the system is measuring the range sideways to the retroreflector at Q. When that retroreflector is too far behind, beam 18 will change to the retroreflector at R.

Figure 3:
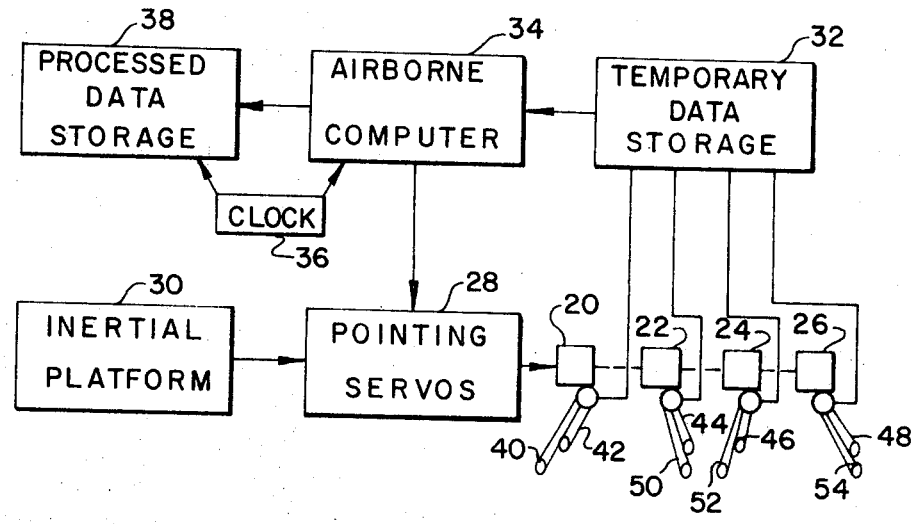
FIG. 3 is a block diagram, somewhat perspective, of a measurement system embodying the invention.

Referring now to FIG. 3, there is shown a block diagram of the measurement system aboard the aircraft which is comprised of laser and optical tracking assemblies 20, 22, 24, and 26; a pointing servo unit 28; an inertial stable platform 30; a temporary data storage unit 32; a computer 34; a clock 36; and a processed data storage unit 38. A laser beam 40 generated from laser and optical tracking assembly 20 incrementally scans the ground surface in response to search signals from pointing servo unit 28. By way of example, one type of search pattern is illustrated in FIG. 4.

A wide angle receiver beam 42 from laser and optical tracking assembly 20 and narrow angle receiver beams 44, 46, and 48 from laser and optical tracking assemblies 22, 24, and 26, respectively, are directed toward the ground. The received signals from each of the laser and optical tracking assemblies representing the range to the correlative retroreflector and signals representing the angle subtended by each of the receiver beams with respect to a reference plane are applied to temporary data storage unit 32. Data signals as at the output of temporary data storage unit 32 are applied to computer 34 for processing. Command signals from computer 34 representing the proper pointing angle of each of the laser beams 50, 52, and 54 from laser and tracking assemblies 22, 24, and 26, respectively, are applied to laser beams. It is to be understood that each of laser beams 40, 50, 52, 54 and each of receiver beams 42, 44, 46, 48 are collimated to each other respectively. That is, laser beam 40 and receiver beam 42 are collimated to each other, laser beam 50 and receiver beam 44 are collimated to each other, and so on. After wide angle scanning beam 40 locates a retroreflector, that retroreflector at some later time must be tracked with a narrow angle beam in order to obtain the precision of which the system is capable. In order to assure later acquisition of the retroreflector by the narrow beam, computer 34 stores the location of each retroreflector in its memory. A precise location can be obtained if the angular spread of the scanning beam is decreased immediately after acquisition while tracking is continued. Inertial stable platform 30 provides temporary coordinate information to pointing servo unit 28 when the laser beams are being switched from one retroreflector to another. Final data from computer 34 and timing pulse from clock 36 are applied to processed data storage unit 38. It is to be understood that, in an alternative embodiment, the system is comprised of one scanning beam with beam angle control, one ordinary narrow angle beam, an inertial platform and a computer. In this case, the narrow beam remains fixed on a rearward retroreflector as long as it is visible, while the scanning beam makes measurements on each new retroreflector as it is acquired and then searches for another one. In the intervening time, the inertial platform operates to maintain position knowledge.

Referring now to FIG. 5, there is shown an alternative embodiment of the invention for topographical mapping. Generally, the airborne system is comprised of illumination sources 58, 60, and 62; radiation sensors 64, 66, and 68; a control 78; a stable platform 70; a computer 72; a display 74; and a recorder 76. Illumination sources 58, 60, 62; radiation sensors 64, 66, 68; and control 78 are mounted to stable platform 70. A gyro unit 56 is affixed to platform 70 for stabilization thereof.

Figure 6:
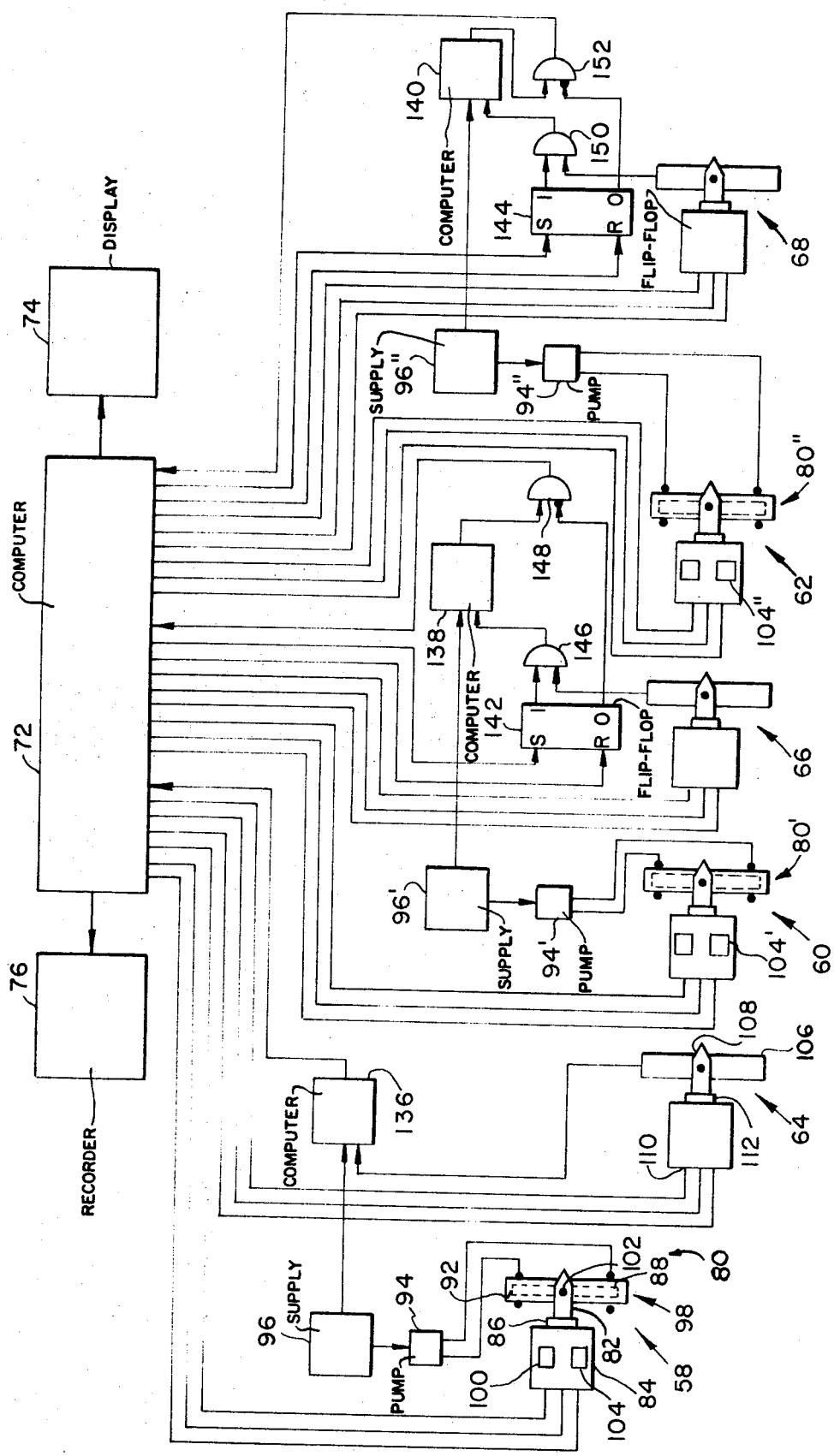
FIG. 6 is a schematic diagram showing certain circuits details of the system of FIG. 5.

As shown in FIG. 6, each of illumination sources 58, 60, and 62 is comprised of a coherent energy generator 80 pivotally mounted to a support 82 which is rotatably mounted to a control 84 via a housing 86. In the illustrated embodiment, energy generator 80 is a laser of the type having a gas filled tube 88, Fabry-Perot plates 90 and 92 fixed at opposite extremities of tube 88, and a pump 94 coupled to the gas in tube 88. Pumping power is applied to laser 80 from a frequency modulated supply 96 via pump 94 and a frequency modulated coherent energy beam is emitted at 98. Control 84 includes a servo 100 for governing the pivoting movement of laser 80 about a shaft 102 and the rotating movement of housing 86 with respect to control 84, and a servo-follower 104 for providing output signals representing the angular position of laser 80. For convenience, like elements of illumination sources 58, 60, and 62 will be designated with the same reference character and will be distinguished by prime and double-prime notation. That is, supply 96' and 96'' of illumination sources 60 and 62, respectively, correspond to supply 96 of illumination source 58, and so on.

Each of radiation sensors 64, 66, and 68 is comprised of a radiation-detector 106 pivotally mounted to a support 108 which is rotatably mounted to a control 110 via a housing 112. In the illustrated embodiment, radiation-detector 106 is an optical tracker of the type shown in FIG. 7, for example an image dissector tube.

Image dissector tube 106 is comprised of a photocathode 114, an electron-optic imaging system 116, an aperture plate 118, a photomultiplier structure 120, and an anode 122. A received signal is imaged by a lens 124 onto photocathode 114 and the photocathode electrons are imaged onto plate 118. Since plate 118 has a small opening or hold 126, only those electrons from a very small spot on photocathode 114 enter photomultiplier structure 120. A varying voltage is applied to horizontal and vertical deflection plates 128, and 130, respectively, in consequence the small hole is, in effect, moved around the photocathode area. If the hole is moving in a path concentric with the spot, the signal at anode 122 is at a constant level. If the hole is moving in a path eccentric with the spot, the signal at anode 122 is sinusoidal. For small deviations, the magnitude of the signal as at the output of tube 106 is proportional to the distance between the centers of the spot and hole path and the phase of the signal is proportional to the direction of the error signal. Thus, if the DC component of the varying voltages on plates 128 and 130 is readjusted in accordance with the signal, so that the signal level is brought close to zero, the light spot is being tracked on the tube. The DC voltage are thus proportional to the light displacement and represent a refined angle measurement.

Control 78 includes comparators 136, 138, 140; flip-flops 142 and 144; and AND gates 146, 148, 150, and 152.

Referring again to FIG. 5, it will be seen that the frequency modulated beams from illumination sources 60 and 62 are directed toward ground retroreflectors 132 and 134, respectively, while the frequency modulated beam from illumination source 58 incrementally scans the ground. The search pattern described by the coherent beam from illumination source 58 is governed by a search command signal generated by computer 72 and applied to control 84, as illustrated in FIG. 6. Each of illumination sources 58, 60, 62 and each of radiation sensors 64, 66, 68, respectively are collimated to each other. That is, illumination source 58 and radiation sensor 64 are collimated to each other; illumination source 60 and radiation sensor 66 are collimated to each other; and illumination source 62 and radiation sensor 68 are collimated to each other. It is to be understood that, in alternative embodiments, reference characters 132 and 134 are other than a retroreflector, for example a transponder, a beacon and the like or a combination thereof.

The frequency modulated received signal as at the output of radiation sensor 64 is applied to one input of a comparator 136. A signal of the same frequency as that applied to pump 94 is applied to other input of comparator 136. In consequence, a difference or doppler frequency signal representing the range between radiation sensor 64 and ground is presented at the output of comparator 136. The signal as at the output of comparator 136 is applied to computer 72.

The frequency modulated received signal as at the output of radiation sensor 66 is applied to one input of AND gate 146, the other input of AND gate 146 is connected to the "1" terminal of flip-flop 142. The output of AND gate 146 is applied to one input of comparator 138. A signal of the same frequency as that applied to pump 94' is applied to the other input of comparator 138. In consequence, a difference or doppler frequency signal representing the range between radiation sensor 66 and ground is presented at the output of comparator 138. The signal as at the output of comparator 138 is applied to one input of AND gate 148, the other input of AND gate 148, a "NOT" input, is connected to the "0" terminal of flip-flop 142. The signal as at the output of AND gate 148 is applied to computer 72.

The frequency modulated received signal as at the output of radiation sensor 68 is applied to one input of AND gate 150, the other input of AND gate 150 is connected to the "1" terminal of flip-flop 144. The output of AND gate 150 is applied to one input of comparator 140. A signal of the same frequency as that applied to pump 94" is applied to the other input of comparator 140. In consequence, a difference or doppler frequency signal representing the range between radiation sensor 68 and ground is presented at the output of comparator 140. The signal as at the output of comparator 140 is applied to one input of AND gate 152 the other input of AND gate 152, a NOT input, is connected to the "0" terminal of flip-flop 144. The signal as at the output of AND gate 152 is applied to computer 72.

Signals representing the angular position of each of lasers 80, 80', and 80" with respect to a reference plane specified by stable platform 70 are applied to computer 72 from each of servo-followers 104, 104', and 104". As previously stated, signal representing the range between each of the radiations sensor and ground is applied to computer 72. In consequence, by utilizing triangulation techniques, the signals as at the output of computer 72 which are applied to display 74 for presentation and recorder 76 for storage represent the ground contour.

In the operation of the system illustrated in FIG. 6, ranging information is applied to computer 72 from either radiation sensor 66 or radiation sensor 68 for a given period. Initially, by way of example, it will be assumed that illumination source 60 is locked-on to retroreflector 132, radiation sensor 66 is tracking retroreflector 132, and ranging information is applied from radiation sensor 66 to computer 72. At this time, illumination source 62 and radiation sensor 68 are searching for retroreflector 134. Under these conditions, flip-flop 142 is set and flip-flop 144 is reset, in consequence AND gate 146 is enabled and AND gate 150 is disable. When radiation sensor 68 acquires retroreflectors 134, a READY TRACK signal from radiation sensor 68 is applied to computer 72. Ranging information from radiation sensor 68 is not applied to computer 72 at this time since a ONE as at the "O" terminal of flip-flop 144 is applied to the "NOT" input of AND gate 152. When the slant angle between the aircraft and retroreflector 132 reaches a specified value as determined by the pointing angle of laser 80', a BREAK TRACK signal from computer 72 is applied to the reset terminal of flip-flop 142 and a GO signal is applied to the set terminal of flip-flop 144. In consequence, AND gate 148 is disabled and AND 152 is enable. Ranging information is applied now from radiation sensor 68 to computer 72. At this time, illumination source 60 and radiation sensor 66 are searching for the next retroreflector and the cycle continues. It is to be understood that, in an alternative embodiment the number of illumination sources and radiation sources is other than three, for example two or four. In the case of two illumination sources and two radiation sensors, one illumination source and radiation sensor scans the ground and the other illumination sources and radiation sensor track the retroreflector. In this case, stable platform 70 is an inertial platform which provides position information during the time interval that the illumination source and radiation sensor are switching from one retroreflector to another.

Since certain changes may be made in the foregoing disclosure without departing from the scope of the invention herein involved, it is intended that all matter contained in the above detailed description and depicted in the accompanying drawings be construed in an illustrative and not in a limiting sense.

What is claimed is:

1. A measurement system adapted for use with an airborne vehicle, said system comprising:
   a. a plurality of spaced ground means;
   b. means mounted in said vehicle for determining the range between specified ones of said ground means and said vehicle and for determining the angle subtended by pairs of said specified ground means and said vehicle;
   c. means for specifying the position of said vehicle with respect to ground coordinates, said range and angle determining means electrically communicating with said position specifying means, the position of said vehicle with respect to said ground coordinates being determined by triangulation in said position specifying means;

d. source means electrically communicating with said position specifying means for generating first and second coherent energy beams; and e. servo means operatively connected to said source means and electrically connected to said position specifying means, said first beam being directed toward specified ones of said ground means by said servo means, said second beam being directed to scan the ground by said servo means, said servo means being responsive to said position specifying means.

2. The measurement system as claimed in claim 1 wherein the ground coordinate of at least three of said plurality of spaced ground means are known.

3. The measurement system as claimed in claim 1 wherein said system includes stable platform means, said range and angle determining means and said source means mounted to said stable platform means.

4. The measurement system as claimed in claim 3 including display means electrically communicating with said position specifying means, the ground coordinates of said vehicle being presented by said display means.

5. The measurement system as claimed in claim 4 including storage means electrically communicating with said position specifying means, the ground coordinates of said vehicle being recorded in said storage means.

6. The measurement system as claimed in claim 1 wherein said range and angle determining means includes sensor means collimated to said source means for detecting said first, second, and third beams at their correlative ground means.

7. The measurement system as claimed in claim 6 wherein said sensor means is optical tracking means.

8. The measurement system as claimed in claim 7 wherein said optical tracking means is image dissector tube means.

9. The measurement system as claimed in claim 1 wherein said known ground means is retroreflector means.

10. The measurement system as claimed in claim 9 wherein said source means is laser means.

11. The measurement system as claimed in claim 1 including at least a third coherent energy beam generated by said source means, said third beam being directed toward specified others of said ground means by said servo means, said first and third beams being directed toward alternately successive ground means.

12. The measurement system as claimed in claim 11 wherein said range and angle determining means includes sensor means collimated to said source means for detecting said first and third beams at their correlative ground means and for detecting said second beam at the ground.

13. The measurement system as claimed in claim 12 including:

a. means electrically communicating with said source means for frequency modulating each of said beams;

b. comparator means electrically communicating with said frequency modulating means and said sensor means for generating output signals representing the range between said first beam and its correlative ground means, the range between said second beam and ground, and the range between said third beam and its correlative ground means; and c. means electrically communicating with said comparator means and said position specifying means for applying selectively the output signals of said comparator means representing the range between said first beam and its correlative ground means and the range between said third beam and its correlative ground means to said position specifying means.

14. A measurement system adapted for use with an airborne vehicle and a plurality of spaced ground means, said system comprising:

a. means mounted in said vehicle for determining the range between specified ones of said ground means and said vehicle and for determining the angle subtended by pairs of said specified ground means and said vehicle;

b. means for specifying the position of said vehicle with respect to ground coordinates, said range and angle determining means electrically communicating with said position specifying means, the position of said vehicle with respect to said ground coordinates being determined by triangulation in said position specifying means;

c. source means electrically communicating with said position specifying means for generating first and second coherent energy beams; and d. servo means operatively connected to said source means and electrically connected to said position specifying means, said first beam being directed toward specified ones of said ground means by said servo means, said second beam being directed to scan the ground by said servo means, said servo means being responsive to said position specifying means.

* * * * *